May 31, 1949.    G. ROSENBERG ET AL    2,471,545
PICTURE FRAME HAVING PIVOTED CORNER PIECES
Filed April 1, 1946
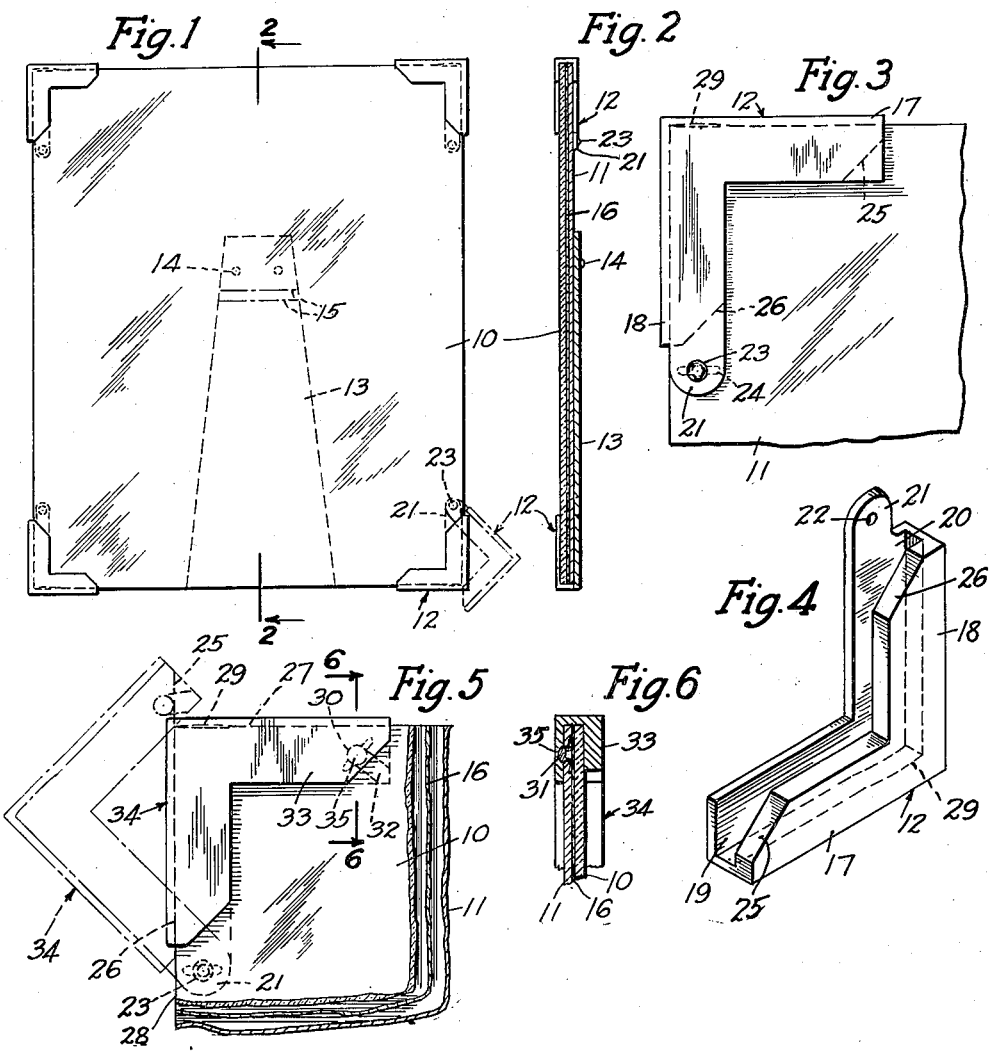
INVENTORS
George Rosenberg
Louis Spiselman
BY
ATTORNEY Patented May 31, 1949

2,471,545

UNITED STATES PATENT OFFICE 2,471,545

PICTURE FRAME HAVING PIVOTED CORNERPIECES

George Rosenberg, New York, and Louis Spiselman, Brooklyn, N. Y.

Application April 1, 1946, Serial No. 658,818

3 Claims. (Cl. 40—156)

1

This invention relates to picture frames and particularly to that type wherein corner pieces are employed to secure a glass plate to a back sheet with the picture removably held therebetween.

In such frames, the corner pieces have customarily been made of sheet metal and hold the glass and back together permanently. In order to permit the insertion or removal of a picture, the glass and back have heretofore been made considerably longer and wider than the picture, and a hinged flap has been partly cut out of the back and made of the same size as the picture to provide an opening of the same size for the passage of a picture into position against the glass, necessitating a blank margin all around the picture. Such necessary margin has heretofore been covered by a separate marginal mat on the front face of the back sheet. The prior construction just described results in a frame much larger than the picture and hence wasteful and comparatively expensive.

The present invention therefore contemplates the provision of a simple and comparatively inexpensive frame including a glass and a back of substantially the same size as the picture and hence economical of material, the glass being removably held to the back by corner pieces secured to the back and movable to a position wherein the glass is freed.

The invention further contemplates the provision of movable picture frame corner pieces, each secured by a single fastening element to the back, the element being so arranged as to permit movement of each corner piece into a position in which the front part of the corner piece is completely free of the glass, while the rear part of the corner piece remains attached to the back, whereby the glass may be lifted or removed to exposed the picture or the front face of the back for removal or insertion of the picture, the corner pieces being movable to their normal positions wherein the parts of the frame are adequately held together.

The invention further contemplates the provision of a movable corner piece for a picture frame, which piece is suitably grooved normally to engage and secure the glass and back together frictionally, and which is secured to the back against loss or complete detachment therefrom.

The invention further contemplates the provision of a frame provided with a back devoid of any opening or integral flap and with movable corner pieces secured to the back, together with auxiliary means for retaining the corner pieces in the operative or frame-holding positions thereof.

The various objects of the invention will be clear from the description which follows and from the drawing, in which Fig. 1 is a front elevational view of a complete picture frame embodying one form of the invention, and showing in dash-dot lines, one of the corner pieces moved to its inoperative or glass-releasing position.

Fig. 2 is a vertical sectional view of the frame taken on the line 2—2 of Fig. 1.

Fig. 3 is a fragmentary rear elevational view of the corner piece and the adjacent frame parts as they appear in the position wherein the corner piece is operative to hold the frame parts together.

Fig. 4 is a perspective view of a corner piece shown in Figs. 1 to 3.

Fig. 5 is a fragmentary front elevational view of a modified form of the corner piece showing one form of the auxiliary means for releasably retaining the corner piece in its operative position, and further showing in dash-dot lines the position assumed by the corner piece when the glass and picture are released.

Fig. 6 is a fragmentary vertical sectional view taken on the line 6—6 of Fig. 5.

In the practical embodiment of the invention shown by way of example, the picture frame comprises the glass 10, the imperforate back 11 usually of paper board, the movable corner pieces 12 and the separate easel 13 of a sheet of paper board secured to the back as by the rivets 14 at the upper end of the easel, suitable score lines as 15 across the easel permitting the easel to be extended rearwardly about the score lines as hinges to an operative position in the usual manner.

The structure and mounting of the corner pieces form an important feature of the invention. By making said pieces movable into a position wherein the glass 10 may be completely freed of the corner pieces, the glass and back need be made only of the same size as the picture 16 and not any larger, thereby dispensing with the marginal material heretofore necessary as well as with the marginal mat heretofore employed, together with the opening and flap heretofore necessary to the back. As best seen in Fig. 4, the corner piece 12 is preferably made of a single piece of material, being generally L-shaped in form and adapted for economical molding in plastic material.

Both legs 17 and 18 of the corner piece are substantially alike and mutually perpendicular, the horizontal leg 17 having a horizontal groove 19 therein intermediate the front and rear faces thereof for the reception of the corner portions of the glass, picture and back. The upright leg 18 has a similar upright groove 20 therein for the reception of the corner side edge portions of the glass, picture and back. The front and rear walls of the grooves in both legs, the bottom wall of the groove 20 and the major part of the bottom wall of the groove 19 are flat for this purpose. It will be noted that the grooves divide the corner piece into a front section and a rear section joined by the integral edge portions of the corner piece, the front section being exposed and visible in front of the glass and the rear section being disposed behind the back 11. The rear section of the upright leg 18 is longer than the front section of said leg, being provided with an extension 21 perforated as a 22 for the passage of the fastening element 23 (Fig. 3). That portion of the bottom wall of the groove 19 nearest the groove 20 and opposite the extension 21 is made arcuate about the center of the perforation 22 to deepen the groove 19 as at 29 and thereby to permit the corner piece to be swung about the element 23 as to pivot without interference with the adjacent corner portions of the glass, picture and back.

The fastening element 23 is made preferably in the form of a hollow rivet passing through the back 11 and flanged preferably on the front face of the back as at 24, the spread flanges of the rivet being sunk preferably flush with and into said front face when the rivet is driven. The front sections of the legs 17 and 18 are bevelled at the respective outer ends thereof as at 25 and 26 for the purpose soon to appear, but the rear sections are preferably not bevelled and remain square.

It will now be understood that the single rivet 23 secures the corner piece pivotally to the back so that the corner piece may be swung about the pivot to an inoperative position, that is, a position wherein the glass 10 is removed completely from the grooves 19 and 20 as illustrated by the dash-dot lines of Figs. 1 and 5. If the bevelled ends 25 and 26 are inclined at an angle of approximately 45°, then on swinging the corner pieces through the same angle, said bevelled ends 25 and 26 will become arranged in alignment with or outside of the respective end and side edges 27 and 28 of the glass 10 and the glass is thereby freed of the corner pieces. The glass may now be removed from the back and the picture 16 or a substitute therefor may be arranged on the back, whereafter the glass is replaced and the corner pieces swung back to their initial or normal positions. In said positions, the end edge portion 27 of the glass, together with the adjacent portions of the back and picture, enter the groove 19 and the side edge portion 28 of the glass together with the corresponding adjacent portions of the back and picture enter the groove 20. Since each of the grooves is of the same or of slightly lesser thickness than the combined thicknesses of the back, picture and glass and since the back is slightly compressible, the back, picture and glass may readily be forced into the grooves to be frictionally retained therein and to retain the corner pieces in their normal holding positions.

The corner pieces need be swung as above described only on the infrequent occasions when a picture is to be inserted or removed from between the glass and the back. The frictional retention of the corner pieces in place is not therefore, materially affected by wear during the life of the frame. However, in those cases where it is desired to have additional or auxiliary means to assist in holding the corner pieces in their normal or operative positions, such means may be efficiently and inexpensively provided as shown in Figs. 5 and 6.

In Figs. 5 and 6 is shown the additional rivet 30 having its head 31 arranged on the rear face of the back 11 and having its other end flanged on and sunk into the front face of the back. The head of the rivet acts in much the same manner as the non-resilient stud of a snap fastener, sliding in the comparatively shallow arcuate groove 32 which is recessed slightly into the front face of the rear section of the horizontal leg 33 of the corner piece 34, the groove being of lesser depth than the rivet head 31. At the inner end of the groove 32, the recess 35 is provided. Said recess is of substantially the same shape as, and of substantially the same depth as or slightly greater depth than that of the rivet head 31, and is arranged in the proper position to permit the rivet head to snap thereinto when the corner piece has reached its final operative position during its movement from the glass-releasing position thereof to the frame-holding position. The rivet head, by its entrance into the deeper recess 35, resists accidental displacement of the corner piece, but does not prevent deliberate swinging movement thereof as when the picture is to be inserted or replaced.

It will be seen that by providing corner pieces movable pivotally on the frame, the glass may be quickly and easily freed for removal when desired, that the sizes of the frame parts need not be greater than the size of the picture, that no skill is required to accomplish the infrequent replacement of the picture in the frame, that the corner pieces may be molded of a single piece of material in ornamental form as desired and retained optionally by simple auxiliary holding means, and that the invention is adequately designed to effect the intended purposes thereof.

While certain specific forms of the invention have herein been shown and described, various changes may be made from said forms within the spirit of the invention as defined in the appended claims.

We claim:

1. In a picture frame provided with a back member and a glass member, an L-shaped corner piece at each corner of the frame, said corner piece having a groove therein extending outwardly from the inner edges thereof toward the outer edges thereof and normally receiving corner edge portions of the back and glass members, the groove dividing the corner piece into a front section and a rear section joined integrally by the outer side and end edge portions of the corner piece, the groove having substantially flat parallel side surfaces, part of the area of one of the side surfaces being arranged in a plane offset from the remainder of said area, the rear section having an extension thereon, a single fastening element passing through the extension and through the back member and thereby pivotally securing the corner piece to the back member for swinging movement of the corner piece relatively to the back and the glass members and into a position wherein the front section is arranged outwardly beyond the glass member while the extension is retained on the back member by said fastening element, and a part on the back entering the groove and engaging the aforesaid offset part of the area of a side surface of the groove and sliding thereon as the corner piece is rotated about the fastening element into and out of the aforesaid position.

2. In a picture frame having a back and a glass, a grooved corner piece normally receiving corner edge portions of the back and glass, means securing the corner piece to the back for pivotal movement of the corner piece to a position beyond the glass, and auxiliary means for retaining the corner piece in its normal position wherein the back and glass are held thereby, said means comprising a member fixed to and projecting from the back rearwardly and in spaced relation to the securing means, the corner piece having a recess therein normally and removably receiving the member, the member being provided with a laterally projecting head, and the recess in the corner piece being elongated and in the form of a groove arranged substantially concentrically about the securing means and extending from an inner edge of the rear section partway toward the outer edge of said rear section, said recess being deeper at the end thereof remote from said inner edge than at the remainder of said recess, the deeper end of the recess receiving the head of the member.

3. In a picture frame provided with a back and with a coextensive glass, corner pieces each having a front section and a rear section, said sections being joined at the outer peripheral edges thereof by connecting portions integral with said sections and defining the bottom of a groove therebetween, a fastener pivotally securing an end part of the rear section to the back, and means aiding the fastener to retain the corner piece in an operative position wherein portions of the glass and back are received in the groove, said means comprising an area on the inner surface of one of the sections, which surface constitutes a side surface of the groove, said area being offset out of the plane of the remainder of the aforesaid inner surface and being offset at one end more than at the other end thereof and being movable with the corner piece in an arc about the fastener as a center, and a relatively fixed part on the back engaging said area and thereby changing the lateral distance of said relatively fixed part from the sections as the corner piece is rotated into and out of its operative position.

GEORGE ROSENBERG.
LOUIS SPISELMAN.

REFERENCES CITED

The following references are of record in the file of this patent:

UNITED STATES PATENTS

| Number | Name | Date |
| --- | --- | --- |
| 2,259,434 | Blodgett | Oct. 21, 1941 |

FOREIGN PATENTS

| Number | Country | Date |
| --- | --- | --- |
| 402,911 | Great Britain | 1933 |
| 470,427 | Great Britain | 1937 |